United States Patent [19]

Murakami et al.

[11] Patent Number: 4,639,604
[45] Date of Patent: Jan. 27, 1987

[54] METHOD AND APPARATUS FOR DETECTING AN EDGE POSITION OF A PATTERN AND ELIMINATING OVERLAPPING PATTERN SIGNALS

[75] Inventors: Seiro Murakami, Tokyo; Muneki Hamajima, Kawasaki, all of Japan

[73] Assignee: Nippon Kagaku K.K., Tokyo, Japan

[21] Appl. No.: 851,293

[22] Filed: Apr. 4, 1986

Related U.S. Application Data

[63] Continuation of Ser. No. 593,870, Mar. 27, 1984, abandoned.

[30] Foreign Application Priority Data

Mar. 29, 1983 [JP] Japan .................. 58-51504
Apr. 7, 1983 [JP] Japan .................. 58-60081

[51] Int. Cl.⁴ .................. G01N 21/86; G01V 9/04
[52] U.S. Cl. .................. 250/548; 364/490; 356/400
[58] Field of Search .................. 356/401, 400, 375; 250/548, 557, 560, 561; 364/563, 490, 559

[56] References Cited

U.S. PATENT DOCUMENTS 4,112,309 9/1978 Nakazawa et al. .................. 250/560
4,170,418 10/1979 Aiuchi et al. .................. 356/400
4,219,719 8/1980 Frosien et al. .................. 250/557
4,338,508 7/1982 Jones et al. .................. 356/401
4,531,060 7/1985 Suwa et al. .................. 356/400

FOREIGN PATENT DOCUMENTS 0003848 1/1978 Japan .................. 356/400

Primary Examiner—David C. Nelms
Assistant Examiner—Michael Messinger
Attorney, Agent, or Firm—Michael N. Meller

[57] ABSTRACT

Disclosed is a system for the signal processing of pattern profile information detected by optically or electronically scanning a pattern on an object such as a semiconductor wafer or a mask. The system includes a pattern information detector responsive to the scanning to generate an electric detection signal of a time series corresponding to the pattern along the scanning direction, position detecting means for generating a position signal discriminative for example of the direction of scanning each time the scanning advances a predetermined unit amount, and sampling extract means responsive to the position signals to successively sample the detection signal and obtain digital data of the pattern excluding any overlapping data of the pattern sampled at the same positions whereby even if the scanning involves minute oscillations of the scanning speed, the resulting noise in the detection signal is eliminated and an accurate pattern information signal corresponding to the absolute positions is extracted.

17 Claims, 30 Drawing Figures

FIG. 3
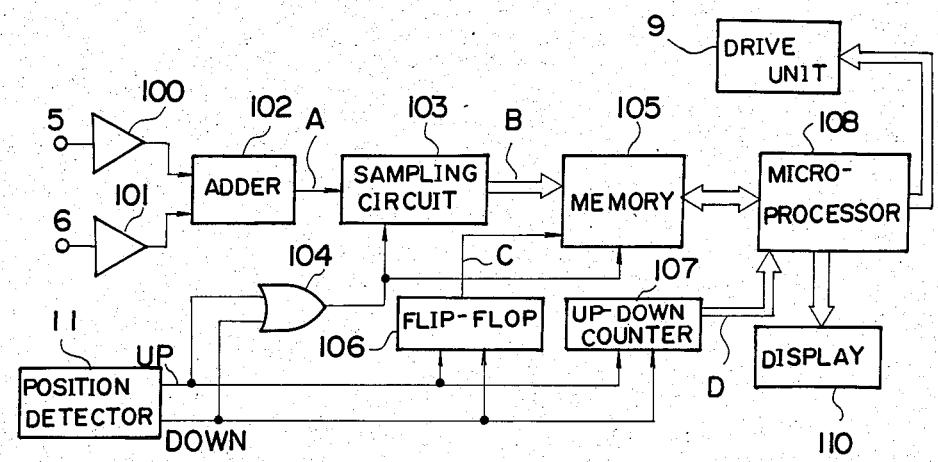
FIG. 4
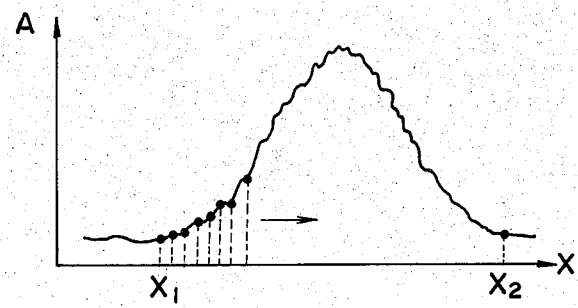
FIG. 6
| C | B |
|---|---|
| 0 | 1 | $i_0$ |
| 1 | 1 | $i_1$ |
| 2 | 0 | $i_2$ |
| 3 | 0 | $i_3$ |
| 4 | 1 | $i_4$ |
| 5 | 1 | $i_5$ |
| 6 | 1 | $i_6$ |
| 7 | 1 | $i_7$ |
| 8 | 1 | $i_8$ |
| 9 | 1 | $i_9$ |
FIG. 5
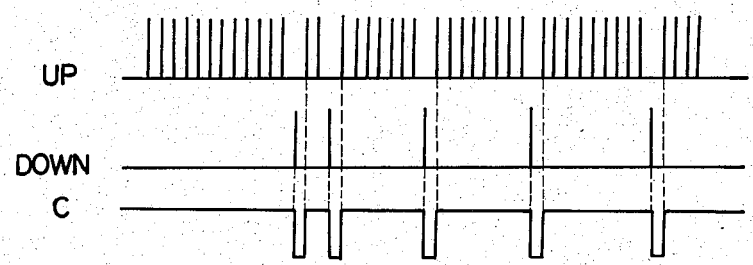

FIG. 7
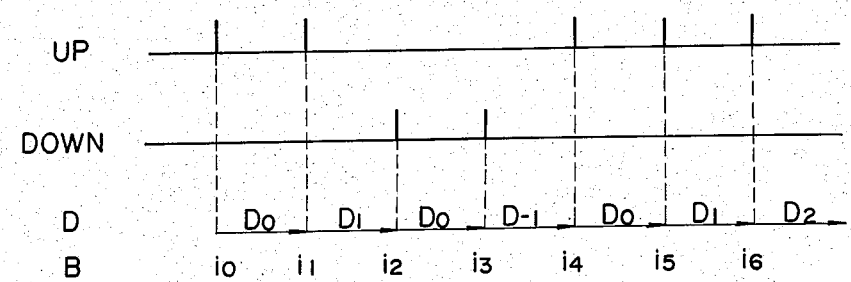
FIG. 8
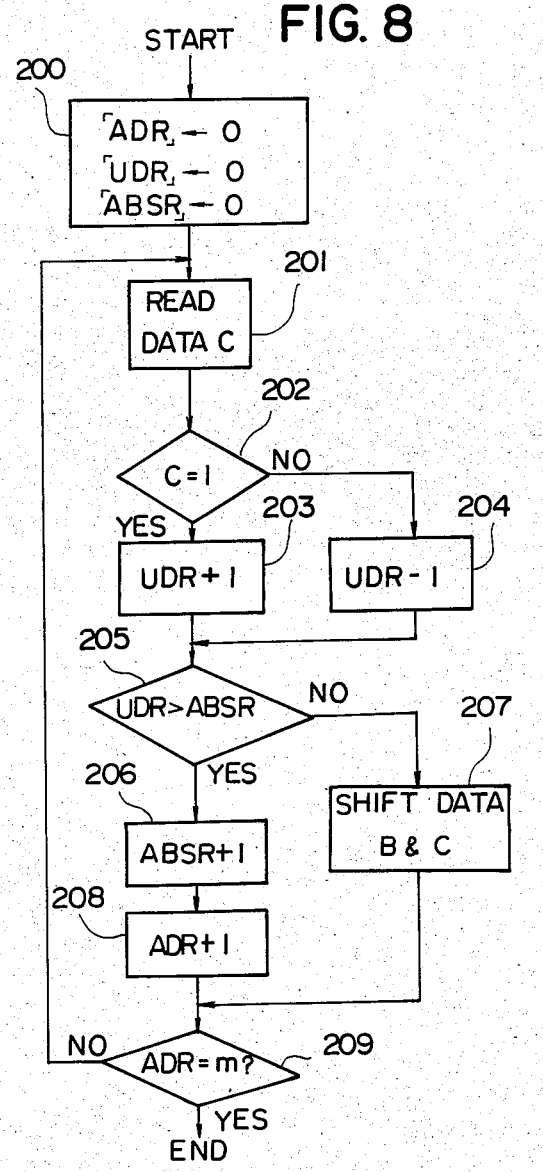
FIG. 9
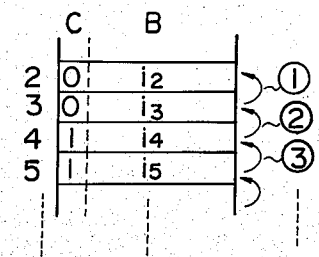
FIG. 10
FIG. 11
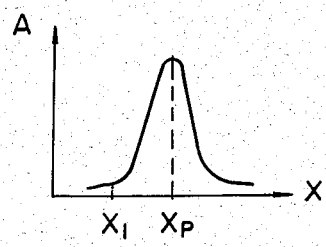

FIG. 14
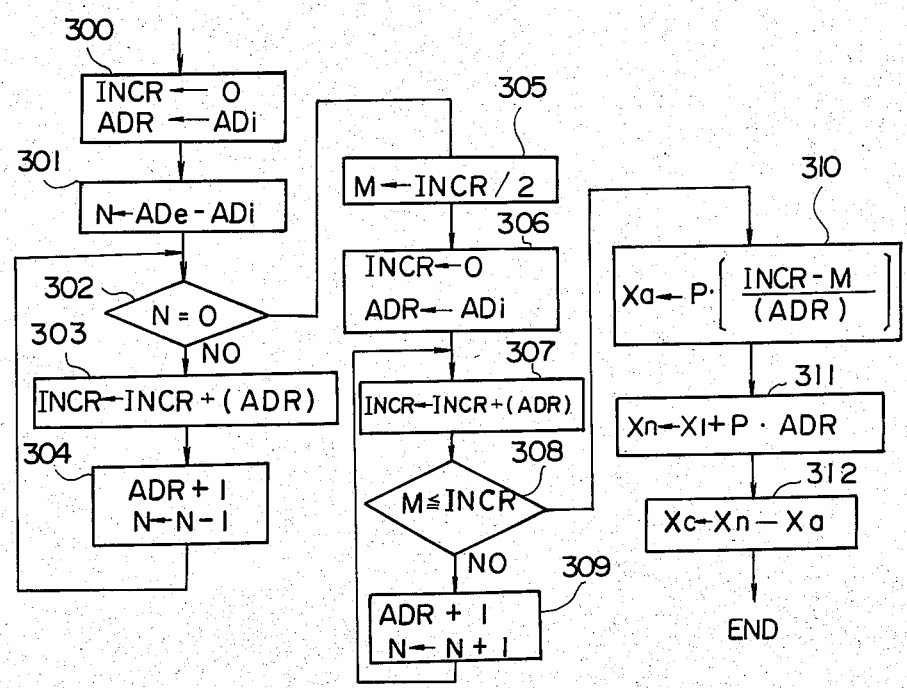
FIG. 15
FIG. 16
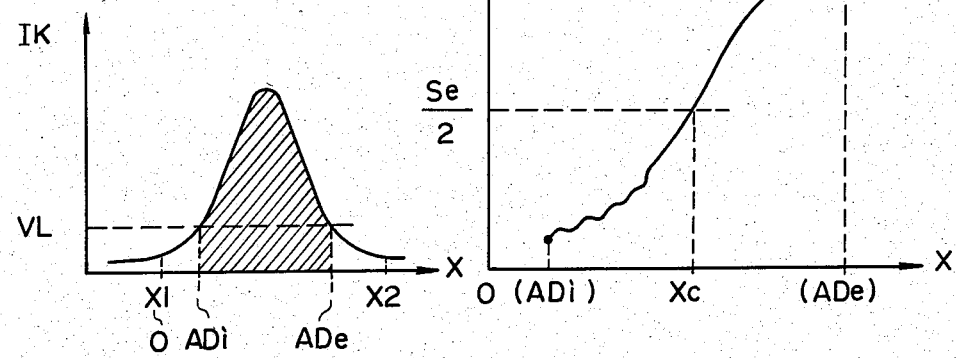

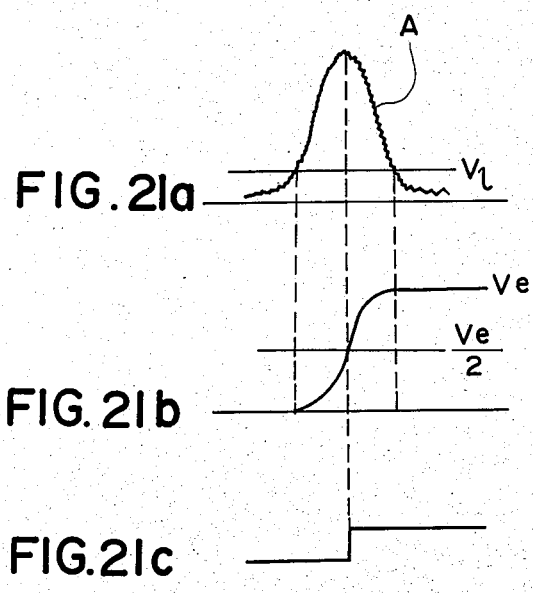
FIG. 21a
FIG. 21b
FIG. 21c
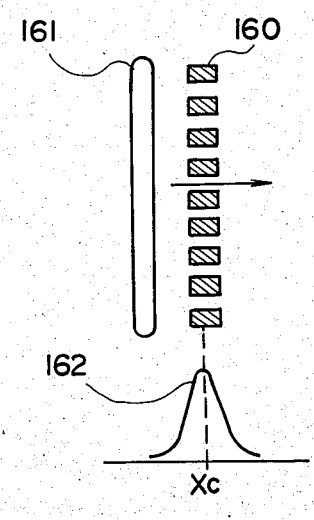
FIG. 23
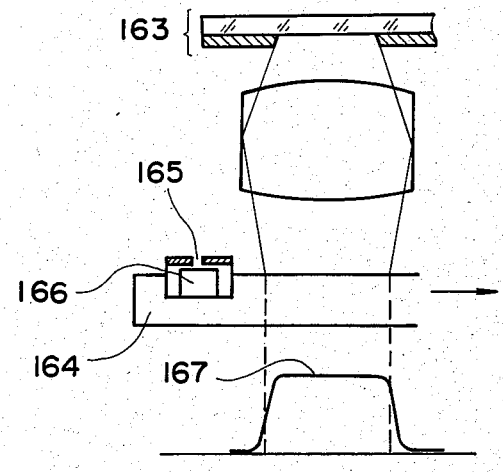
FIG. 24
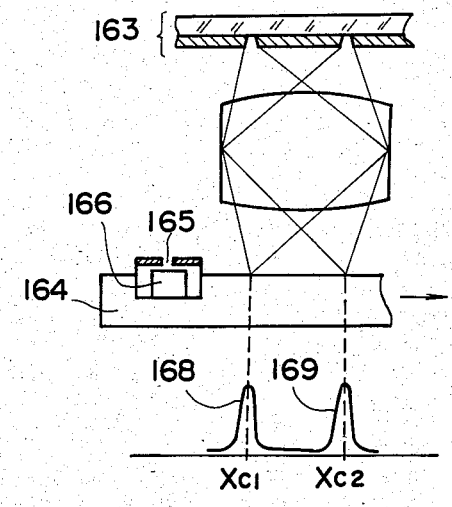
FIG. 25

METHOD AND APPARATUS FOR DETECTING AN EDGE POSITION OF A PATTERN AND ELIMINATING OVERLAPPING PATTERN SIGNALS

This application is a continuation of application Ser. No. 593,870, filed 3/27/84 now abandoned.

BACKGROUND OF THE INVENTION

1. Field of the Invention

The present invention relates to a method and apparatus for detecting the edge positions of a pattern and more particularly to a pattern edge position detecting method and apparatus designed so that a pattern including falls and formed on an object is scanned optically to detect the magnitude, etc., of diffused energy radiated from the fall edges of the pattern and thereby to obtain pattern information indicating for example the positions of the pattern edges, the distance between the pattern falls and the shape and dimensional features of the pattern with a high degree of accuracy. The method and apparatus of this invention are well suited for use in applications such as micro-measuring method and apparatus for measuring the linewidth of micro miniature circuit patterns formed on a mask or semiconductor wafer in the manufacturing process of integrated circuits (ICs) or method and apparatus for detecting the positions of marks on a wafer for mask-wafer aligning purposes by an exposure system in the photolithographic process.

2. Description of the Prior Art

In the manufacturing process of high-density ICs, the detection of circuit patterns on a wafer is effected by means of photoelectric detection employing a so-called radiation beam such as laser beam, high-intensity illuminating light or electron beam. In the case of a method disclosed for example in U.S. Pat. No. 4,112,309 dated Sept. 5, 1978, the convergent laser beam incident to the surface of an object, e.g., a wafer or mask is modulated at a specific frequency and subjected to oscillatory scanning to photoelectrically detect the diffused light scattered from the pattern edge of the object surface, analogically demodulate the resulting electric signal at the modulating frequency, subject the demodulated signal to differentiation (synchronous detection) and detect the zero point of the demodulated and differentiated signal or the center of oscillation of the laser beam as the pattern edge position.

However, this method has practical limitations in that the center of oscillations due to the beam modulation becomes unstable due to variation with time, that the slow detection response of a low-pass filter for synchronous detection purposes makes it impossible to increase the speed of relative movement of the object and the beam with respect to the oscillatory scanning by the beam and that an increase in the oscillation frequency (modulation frequency) of the beam for increasing the speed of relative movement makes the oscillation center unstable with the resulting deterioration in the accuracy of measurements.

SUMMARY OF THE INVENTION

It is the primary object of the present invention to provide a pattern edge position detecting method and apparatus which overcome the foregoing deficiencies in the prior art and are capable of converting the photoelectrically detected information of patterns on an object into signals at a higher speed while maintaining a high degree of accuracy despite the increased detection speed.

More specifically, in accordance with an embodiment of the invention there is thus provided an apparatus for performing a signal processing on the profile information of a pattern on an object such as a semiconductor wafer or a mask which are obtained by optically or electronically scanning the pattern. The apparatus includes a pattern information detector responsive to the scanning of the pattern to generate an electric detection signal of a time series corresponding to the pattern along the scanning direction, position detecting means for generating a position signal discriminative for example of the direction of scanning each time the scanning advances a predetermined unit amount, and sampling extract means responsive to the position signals to successively sample the detection signal and obtain digital data excluding overlapping pattern data sampled at the same positions of the pattern whereby ever if the scanning involves minute oscillations of the scanning speed, the resulting noise in the detection signal is effectively eliminated to extract accurate pattern information signal corresponding to the absolute position with a high degree of accuracy.

In the present application, what is meant by the pattern profile is a distribution of diffused energy produced at the fall edges of a pattern on an object in response to the scanning of the pattern by a spot of the radiation beam, an intensity distribution or energy distribution of a projected image pattern if the pattern is in the form of a projected image or the like.

Thus, in accordance with an embodiment the pattern information detector generates, as the previously mentioned detection signal, an electric signal corresponding to the magnitude of diffused energy produced at the fall of a pattern formed with irregularities or falls on an object in response to the scanning of the pattern by a radiation beam such as a laser beam, high-intensity illuminating light or electron beam. In accordance with another embodiment, the detector generates, as the detection signal, a photoelectric detection signal corresponding to the light intensities of portions of a projected image of a pattern on an object and produced by the scanning of the projected image of the pattern by a photoelectric sensor.

The position signal is generated at intervals of a unit amount of the scan movement and it is discriminated depending on whether the scanning direction is a forward or backward direction.

Also, the sampling extract means is responsive to the position signals to sample and convert the detection signal into digital signals and it is also responsive to the results of discrimination of the position signals to rearrange the digital signals into digital data having eliminated therefrom any overlapping of the detection signal caused at the same positions due to the oscillatory components of the scanning. In accordance with an embodiment, the sampling extract means comprises a sampling circuit including for example a sample and hold circuit and an analog-digital converter for sampling the detection signal at a sampling period corresponding to the arrival of the position signals and generating digital signals, a memory circuit for temporarily storing the digital signals, and a signal processing control circuit including for example a register, a counter and a microprocessor for controlling the writing of the digital signals in the memory circuit or the rearrangement of the written digital signals to obtain digital data excluding any overlapping of the detection signal caused at the same positions due to the oscillatory components of the scanning.

On the other hand, the position detector of this invention detects scanning positions of the pattern on the object from the detection information corresponding to the pattern and obtained by optically or electronically scanning the pattern and the position detector includes pattern information detecting means responsive to the scanning to generate an electric detection signal of a time series corresponding to the pattern along the scanning direction, integrating means for integrating the detection signal over a scanning interval in which the detection signal exceeds a predetermined level, and position detecting means whereby an integrated final value obtained as the result of the integration over the whole scanning interval by the integrating means is divided by a predetermined ratio to obtain an integrated intermediate value and obtain a scanning position corresponding to the integrated intermediate value thus making it possible to effect the desired position detection with an improved S/N ratio and high degree of accuracy at a high speed without any complicate computational operations even in the case of a weak detection signal.

In accordance with an embodiment of the position detector, the pattern information detecting means samples the profile of the pattern corresponding to the scanning positions to generate digital data as the detection signal and the integrating means includes a microprocessor which integrates the digital data in accordance with a predetermined program sequence.

In accordance with another embodiment, the pattern information detecting means generate, as the detection signal, analog signals indicative of the profile of the pattern corresponding to the scanning positions and the integrating means integrates the analog signals generated by the first and second scannings, respectively of the same scanning which is repeated. Also, the position detecting means obtains the desired integrated intermediate value from the result of the integration of the analog signal generated by the first scanning and it also detects a scanning position where the integration result of the analog signal by the second scanning coincides with the integrated intermediate value.

Also, in the case of the analog type, the pattern information detecting means includes gate means for eliminating any overlapping of the detection signal corresponding to the profile through a gating operation according to the position pulses and sending the same to the integrating means and a control circuit for the gate means.

In the present application, what is meant by the profile of a pattern is a distribution of diffused energy produced at the fall edge of the pattern in response to the scanning of the pattern on the object by the spot of radiation beam, an intensity distribution or energy distribution of a projected image pattern if the pattern is in the form of a projected image.

The above and other objects as well as advantageous features of the invention will become more clear from the following description taken in conjunction with the drawings.

BRIEF DESCRIPTION OF THE DRAWINGS

FIGS. 2b, 2c and 2d respectively show edge signal waveforms detected in correspondence to FIG. 2a.

FIG. 3 is a block diagram showing a signal processing system according to the first embodiment of the invention.

FIG. 4 is a waveform diagram showing a detailed waveform of an edge detection signal.

FIG. 5 is a signal waveform diagram showing the relation between position detection signals consisting of up pulses and down pulses and the resulting flag data.

FIG. 6 is a schematic diagram showing a memory table for a case where the digital data and flag data of a sampled edge detection signal are stored in a memory circuit.

FIG. 7 is a timing flow chart for explaining the sampling operation shown in terms of the correspondence with the up and down pulses.

FIG. 8 is flow chart showing a program for a rearranging operation performed on the stored data in the memory circuit by a microprocessor for noise eliminating purposes.

FIG. 9 is a schematic diagram of a memory table useful for explaining the manner of rearrangement.

FIG. 10 is a schematic diagram of a memory table having the noise and overlapping data eliminated by the rearranging operation.

FIG. 11 is a waveform diagram showing an edge signal containing accurate position information without any overlapping data.

FIG. 14 is a flow chart diagram of an integration and position detection processing program executed by a microprocessor.

FIG. 15 is a waveform diagram showing an edge signal containing accurate position information without any overlapping data.

FIG. 16 is a graph showing variations of the integrated value.

FIGS. 21a, 21b and 21c are waveform diagrams useful for explaining the integrating and position detecting operation in the embodiment of FIG. 20.

FIG. 23 is a schematic plan view showing the relation between a pattern and a scanning beam spot according to another example of the edge detection.

FIGS. 24 and 25 are explanatory diagrams showing the principal parts of still another examples of the edge detection.

DETAILED DESCRIPTION OF THE PREFERRED EMBODIMENTS

The present invention will now be described in a greater detail with reference to the illustrated embodiments.

Figure 1:
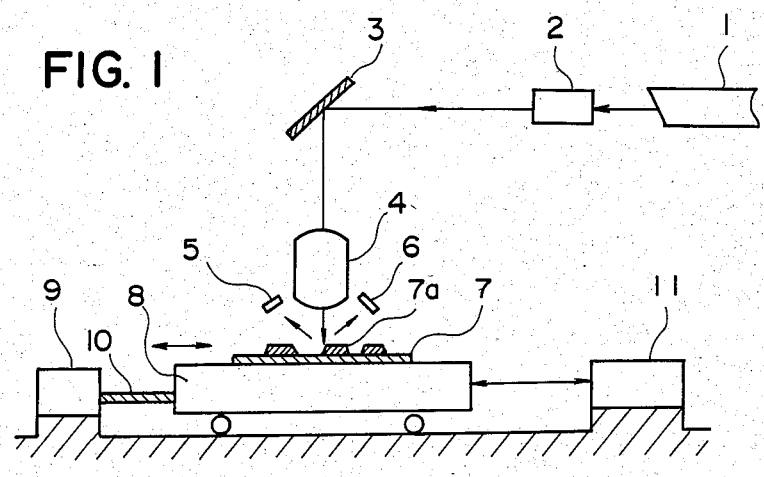
FIG. 1 is a schematic diagram schematically showing the construction of an embodiment of the present invention.
Figure 2A:
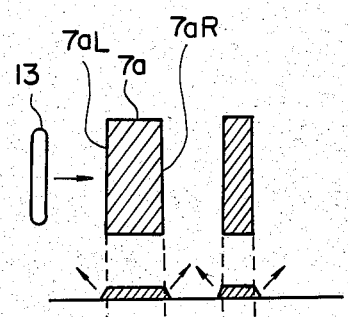
FIG. 2a is a schematic plan view showing the relation between patterns to be detected and a scanning spot of beam.
Figure 2B:
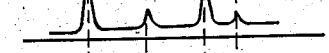
Figure 2C:
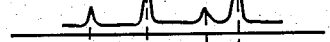

Referring to the schematic diagram of FIG. 1 showing schematically the construction of an embodiment of the present invention, the laser beam from a laser beam source 1 is expanded by an illuminating optical system 2 including a beam expander, a cylindrical lens, etc., and its optical path is changed by a reflecting mirror 3 so that the laser beam is passed through an objective lens 4 as a satisfactorily converged beam and it focuses an elongate spot of beam on an object or specimen 7 such as a wafer. The lengthwise direction of the beam spot is directed toward the edge of a pattern so that the diffused light from the specimen surface are detected as electric signals by photoelectric conversion elements 5 and 6 arranged around the objective lens 4 by utilizing for example the method disclosed in U.S. Pat. No. 4,112,309. In this embodiment, the specimen 7 is fixedly mounted on a stage 8 in such a manner that the specimen 7 is arranged along a plane perpendicular to the optical axis of the objective lens 4 and the stage 8 is moved for example on the plane perpendicular to the optical axis of the objective lens 4 and containing the lateral directions in the Figure by a drive unit 9 through a feed screw 10, etc. The position of the stage 8 is detected by a position detector 11 comprising for example a laser interferometer or encoder which generates position signals discriminative of the direction of movement and therefore the scanning positions of the elongate beam spot which scans the specimen surface by the movement of the stage 8 are obtained from the position detector 11. In response to the scanning, as shown in FIG. 2a, the intensity of the diffused light from edges 7aR and 7bL of a raised pattern 7a on the specimen 7 are detected by the photoelectric conversion elements 5 and 6 and the resulting detection signals respectively have waveforms as shown in FIG. 2b for the element 5 and FIG. 2c for the element 6. The signal waveform shown in FIG. 2d corresponds to the combined signal of the waveforms in FIGS. 2b and 2c or the detection signals from the elements 5 and 6 and the width W of the pattern 7a can be detected from the signal of FIG. 2d. In FIG. 2a, numeral 13 designates an elongate beam spot.

Figure 2D:

FIG. 3 is a block diagram showing a signal processing system according to the embodiment of the invention and it is designed to receive the output signals from the photoelectric conversion elements 5 and 6 and the position detector 11 and generate a signal output containing pattern information corresponding to the absolute positions of the previously mentioned scanning. The detection signals from the photoelectric conversion elements 5 and 6 are respectively amplified by amplifiers 100 and 101 and are then combined by an adder 102 thus producing an edge signal as shown in FIG. 2d and thereby detecting optical pattern information as an electric signal. The electric detection signal containing the thus detected pattern information is applied to a sampling circuit 103 forming a part of a sampling extract section. The sampling extract section incudes the sampling circuit 103, a memory circuit 105 and a microprocessor 108, and the sampling circuit 103 includes for example a combination of a sample and hold circuit and an analog-digital converter. In the present embodiment, the position detector 11 is responsive to the scan movement of the stage 8 so that each time the stage 8 makes a predetermined unit amount of movement (e.g., 0.04 μm), a pulse is generated discriminatively, that is, an up pulse is generated when the direction of movement is the same with the scanning direction and a down pulse is generated when the direction of movement is opposite. In the case of FIG. 3, the up and down pulses are applied to the sampling circuit 103 and the memory circuit 105 through an OR circuit 104 and they are also supplied to a flip-flop circuit 106 and an up/down counter 107. When the up and down pulses are applied through the OR circuit 104, in synchronism with the input pulses, the sampling circuit 13 samples and converts the detection signal from the adder 102 to digital signals and successively stores the same in the memory circuit 105. The flip-flop circuit 106 is set by the up pulse and reset by the down pulse and its output data C is applied as a scan direction discriminating flag to the memory circuit 105 so that it is stored as a different 1-bit information within the same address area of the memory circuit 105 simultaneously and along with the storage of the sampled digital signal. The up/down counter 107 adds "+1" in response to each up pulse and "−1" in response to each down pulse and its count value is supplied as position data D indicative of the position of the stage 8 to the microprocessor 108.

A display 110 displays an edge pattern detected by the microprocessor 108. In accordance with a method which will be described later, the microprocessor 108 detects the position of the edge and actuates the drive unit 9 thereby maintaining a predetermined relation between the stage 8 and the optical system 2.

In FIG. 4 showing in enlarged form the detection signal from the photoelectric conversion elements detecting one (e.g., 7aL) of the edges of the pattern 7a shown in FIG. 2, the abscissa represents the scanning position x and the ordinates represents the signal amplitude A. Generally, even if the stage 8 is moved in one direction at a uniform speed, small oscillations of the micron order are caused in the direction of movement. As a result, the edge detection signal does not results in an essential smoothly peaked waveform but results in a waveform which swings due to the minute oscillations as shown in FIG. 4. Also, in this case, the up and down pulses from the position detector 11 become as shown in FIG. 5 and the down pulses are generated at places despite the fact that only the up pulse would in fact be generated since the stage 8 is moved in one direction.

Then, as the stage 8 is moved so that it reaches a position $x_1$ just before the position where the edge detection signal A of FIG. 4 begins to appear, the microprocessor 108 changes the operating mode of the memory circuit 105 to a write mode. In this case, the position $x_1$ is preliminarily stored in the microprocessor 108 so as to put the memory circuit 105 in the write mode. At the same time that the microprocessor 108 places the memory circuit 105 in the write mode, the data D of the position counted by the up/down counter 107 is stored in the internal register of the microprocessor 108. Note that while the writing of the data D is selectively determined in dependence on the storage capacity of the memory circuit 105, it is assumed that in this embodiment the writing is continued up to a position $x_2$ at which the edge detection signal is terminated. Also, the distance to the position $x_2$ is an integral multiple of the unit movement of the stage 8. On the other hand, the memory circuit 105 is responsive to an output pulse generated from the OR circuit 104 to increase by 1 the address of the area for storing the data B from the sampling circuit 103. As a result, when the first pulse is generated from the OR circuit 104 after the memory circuit 105 has been placed in the write mode, the amplitude value of the edge detection signal is stored as digitized data B in the memory circuit 105 at an address 0 and "0" or "1" flag data C is stored at a specific bit position of the address 0. The flag data C is the output of the flip-flop circuit 106 which goes to "1" when an up pulse is generated and goes to "0" when a down pulse is generated as shown in FIG. 5. When the data B and C are stored in the memory circuit 105 at the address 0 in this way, the next address 1 is made accessible.

As mentioned above, in response to the generation of each up or down pulse produced by the OR circuit 104, the address of the memory circuit 105 is updated and digital data B and flag data C are successively stored. This may be effected at a high speed by means of the direct memory access method for example.

The above-mentioned write operation of the data B and C will now be described in a greater detail with reference to FIGS. 6 and 7. FIG. 6 is a schematic diagram showing a memory table of the data B and C stored in the memory circuit 105 and FIG. 7 is a timing chart for explaining the sampling operation of the edge position signal on and after the position $x_1$.

In FIG. 6, the flag data C goes to "1" when an up pulse is generated and goes to "0" when a down pulse is generated as mentioned previously.

FIG. 7 shows the up and down pulses of FIG. 5 in enlarged form with respect to the abscissa (the position).

Symbol D designates the data D from the up/down counter 107 and B the data B from the sampling circuit 103. Data $D_1$, $D_0$, $D_1$ and $D_2$ designate the positions of the stage 8 which are respectively displaced from each other by the unit amount in this order in the forward direction.

The data B or $i_0$ is written first at the address 0. At this time, an up pulse is present so that the flag data C goes to "1" and a "1" is stored as the data C at the address 0 in the memory table of FIG. 6. When the data C goes to "1" at the address 0 or when the first up pulse is generated in FIG. 7, the up/down counter 107 increases its count by 1 and generates data D of a content $D_0$.

Then, when the second up pulse is generated in FIG. 7, data B or $i_1$ and data C of "1" are stored in the memory table at the address 1 and the count of the up/down counter 107 is further increased by 1 thus causing its data D to become $D_1$. Then, two down pulses are generated successively and up pulses are again generated as shown in FIG. 7. Thus, data B or $i_2$ and $i_3$ are respectively stored, along with flag data C of "0", at the addresses 2 and 3 of the memory table in FIG. 6 and then data B or $i_4$, $i_5$ and $i_6$ are respectively stored, along with data C of "1", at the addresses 4 et seq. In this way, during the time that the stage 8 is moved from the position $x_1$ to the position $x_2$, the edge detection signal is sampled at intervals of the unit movement of the stage 8 or the pulse spacing of the up and down pulses as shown in FIG. 4 and the resulting data B are successively stored along with the corresponding flag data C determined by the up or down pulses, in the memory circuit 105.

Now consider the output of the up/down counter 107 at the address 2 which is generated upon generation of a down pulse. The counter 107 receives the down pulse so that its count is decremented by 1 and its output D is returned from $D_1$ to $D_0$. Also, a down pulse is generated at the address 3 and thus the output data D of the up/down counter 107 becomes $D_{-1}$. Then, an up pulse is generated at the address 4 so that the data D is incremented and it becomes $D_0$. Thereafter, the data D is incremented by the generation of each up pulse so that it becomes $D_1$ at the address 5 and $D_2$ at the address 6.

To be noted here is the fact that as will be seen from the output data D of the counter 107, the data B having the true one-to-one correspondence to the positions of the stage 8 are $i_0$, $i_1$ and $i_6$ and the other data B or $i_2$, $i_3$, $i_4$, and $i_5$ are the overlapping sampling data produced by the backward movement of the stage 8 due to the minute oscillations. In other words, the data $i_2$ is a duplicate of $i_0$, $i_3$ a duplicate of $i_{-1}$ which is not shown, $i_4$ a duplicate of $i_0$ and $i_5$ a duplicate of $i_1$. Thus, all of these data are undesired ones.

In accordance with the present embodiment, after all of the data B generated by the scanning movement of the stage 8 have been stored in the memory circuit 105, the microprocessor 108 judges and discriminates the data array within the memory table in accordance with the "1" and "0" states of the flag data C and the data array is rearranged and read as one having one-to-one correspondence to the positions of the stage 8 with respect to the stage movement in the forward direction thus eliminating the undesired data.

In this case, the microprocessor 108 may be comprised of one which has access to the memory circuit 105 for the writing and reading, such as, an ordinary microcomputer which is operable by a software program or the previously mentioned hardware processor used exclusively for signal processing purposes.

FIG. 8 is a flow chart showing the procedure for rearranging the data B and C stored in the memory circuit 105 as shown in FIG. 6 by means of the microprocessor 108.

The microprocessor 108 includes, as its functions, an address register (hereinafter referred to as an ADR) for addressing the memory circuit 105 as well as an up/down register (hereinafter referred to as a UDR) and an absolute register (hereinafter referred to as an ABSR). Of these registers, the UDR is incremented by each "1" state and decrement by each "0" state of the flag data C at the addresses in the memory circuit 105 thus functioning in the like manner as the up/down counter 107. On the other hand, the register ABSR is simply incremented so as to indicate the absolute positions of the stage 8 according to the "0" and "1" states of the flag data C.

Note that in the present embodiment the direction of movement of the stage 8 which causes the generation of up pulses is considered as a forward direction and a description will now be made with reference to a case where the processing is effected on the bases of the sampling data obtained by the forward movement of the stage 8.

When the data B sampled as shown in FIG. 6 are stored, along with the flag data C, in the memory circuit 105, the microprocessor 108 executes its rearranging program. In FIG. 8, when the program is started, an initialize step 200 is performed so that the leading address or the address 0 of the memory circuit 105 is set in the register ADR and a "0" is set in the registers UDR and ABSR, respectively. Then, a flag data C read step 201 is performed so that the microprocessor 108 reads the data C from the contents of the memory address 0 designated by the register ADR. In this case, the data C is "1" as shown in FIG. 6.

Then, a comparison step 202 is performed so that if the read data C is "1", a transfer is made to a step 203 to increment the register UDR. If the data C is 0, the register UDR is decremented at a step 204.

In this case, the data C is "1" so that a transfer is made to the step 203 and the count value of the register UDR is changed from 0 to +1. Then, at a step 205, the count values of the registers UDR and ABSR are compared so that a transfer is made to a step 206 when UDR>ABSR and a transfer is made to a step 207 when UDR≦ABSR. In this case, the count value of the register UDR is +1 and the count value of the register ABSR is 0 thus causing a transfer to the step 206. At the step 206, the register ABSR is incremented and in this case the count value changes from 0 to +1. Then, at the next step 208, the register ADR is incremented so that in the like manner the count value change from 0 to +1 and the designated address changes from the address 0 to the address 1.

A step 209 determines whether the addressing by the register ADR has passed through the final address in the memory circuit 105. If it is, the program is ended. If it is not, a return is made to the step 201. Here, the final address is designated as an address m. In this case, the register ADR designates the address 1 so that a return is made to the step 201 and the flag data C at the address 1 is again read out. Since the data C is "1", the steps 203, 205, 206 and 208 are performed successively so that the register UDR is changed from +1 to +2, the register ABSR from +1 to +2 and the register ADR from +1 to +2 thus designating the address 2. At the step 209, a return is again made to the step 201 and the program is executed in the like manner on the address 2. In this case, however, the flag data C at the address 2 is "0" so that a transfer is made from the step 202 to the step 204 where the register UDR is decremented from +2 to +1 and then the counts are compared at the step 205. Since the count of the register UDR is +1 and the count of the register ABSR is +2 at the step 205, the decision results in UDR<ABSR and therefore a transfer is made to the step 207.

The step 207 is a processing step which deletes the data B at the current address as duplicate data. More specifically, the data B and C at the addresses following the currently processed address are shifted one address ahead as shown schematically in FIG. 9.

In the case of this embodiment, the data B and C in the memory circuit 105 are shifted ahead in such a manner that in FIG. 9 1 the data B and C at the address 2 designated by the register ADR are deleted and the data B and C at the following address 3 are transferred to the current address 2, 2 the data B and C at the address 4 are transferred to the address 3, 3 the data B and C at the address 5 are transferred to the address 4 and so on.

In this way, the data B or $i_2$ and the corresponding flag data C or "0" are deleted from the memory circuit 105 and the remaining data B and the corresponding data C are moved up by one toward the leading address thus effecting the desired rearrangement.

After the step 207 has been finished, a transfer is made to the step 209 so that since the step 208 has not been performed and the count of the register ADR is still +2, a return is again made to the step 201 and the program is executed on the address 2. At the step 201, the data C stored at the address 2 is read out so that the data C read out at the step 201 is "0" since the data B and C previously stored at the address 3 in FIG. 6 have been transferred and written at the address 2 by the previously mentioned rearrangement processing.

Thus, the similar program is thereafter executed in accordance with the flow chart of FIG. 8 so that when the processing of the final address is completed, the sampling data of the edge detection signal having one-to-one correspondence to the positions of the stage 8 are stored in the memory circuit 105 as shown in FIG. 10. The data corresponds to the essential edge signal excluding all the noise or the duplicate sampling data due to the oscillations of the stage 8 in the direction of movement and it is needless to say that there is one-to-one correspondence between the addresses of the data in the memory circuit 105 and the forward positions of the stage 8 at intervals of the unit amount of spacing in the forward scan movement. The data is shown in FIG. 11 in which, in correspondence to FIG. 4, the abscissa represents the position and the ordinate represents the amplitude and the data is extremely suitable for use as a smoothed edge signal in the subsequent information extraction. Also, where the position $x_i$ is not an integral multiple of the unit amount of movement of the stage 8, it is only necessary for the microprocessor 108 to function so that when the position of the stage 8 passes the position $x_1$, data $D_1$ is stored and the data $D_1$ is used as the position of the stage 8 instead of the position $x_1$ thereby effecting the required conversion.

On the other hand, to measure the linewidth of the pattern or the distance (edge spacing) between the edges 7aL and 7aR in the case of the pattern 7a, the microprocessor 108 performs the previously mentioned digital processing on each of the edge signals for the edges 7aL and 7aR and then detects the peak position of each of the resulting edge signals excluding the noise.

In other words, assuming that in FIG. 11 xp represents the peak position of the edge signal for the edge 7aL, P represents the unit amount of scan movement of the stage 8 (or the up and down pulse spacing), and the maximum data B is stored in the memory circuit 105 at the nth address from the leading address, then the peak position xp is easily obtained from the following equation $$xp = x_1 + n \cdot P$$

Similarly, if x′p represents the peak position of the edge signal for the other edge 7aR, X′$_1$ represents the writing start position of data B and the peak of the data B is stored in the memory circuit 105 at the n'th address from the position X′$_1$, then the peak position x′p is given by $$x'p = x'_1 + n' \cdot P$$

Therefore, the linewidth of the pattern 7a is obtained from the difference between the positions xp and x′p. In particular, where the writing start positions $x_1$ and x′$_1$ of the two data B are the same with each other, the linewidth can be easily obtained from $xp - x'p = (n - n') \cdot P$.

Figure 12:
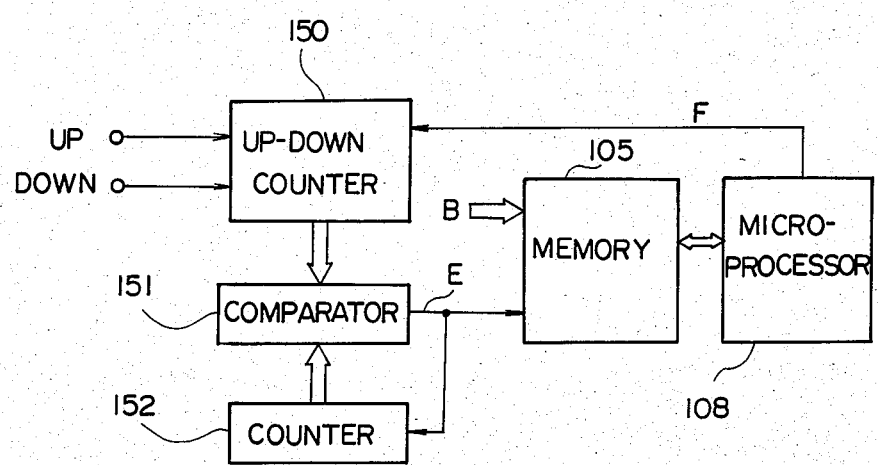
FIG. 12 is a block diagram showing the principal part of a signal processing system according to another embodiment of the invention.

Next, another embodiment of the sampling extract means for eliminating the noise components or the duplicate data contained in the data B in the memory circuit 105 will be described with reference to FIG. 12. FIG. 12 is a block diagram showing the principal circuit construction designed to effect the noise elimination by hard logics in place of the previously mentioned program of FIG. 8 and the same reference numerals as used in FIG. 3 designate the same component elements. In this embodiment, the writing of the data B from the sampling circuit 103 into the memory circuit 105 is effected in such a manner that there is no need to use flag data as in the case of the previously mentioned embodiment and data B rearranged as shown in FIG. 10 in a real time fashion by a method designed to completely reject any duplicate data are written into the memory circuit 105.

More specifically, in FIG. 12 an up-down counter 150 for receiving the up and down pulses from the position detector 11, is responsive to a start signal F generated from the microprocessor 108 so that it is incremented by each up pulse and decremented by each down pulse thus supplying its count output to one input of a comparator 151. The other input of the comparator 151 receives the count output of a counter 152 which counts comparator outputs. The comparator 151 generates a trigger pulse E only when the count output of the up-down counter 150 is greater than the count output of the counter 152 and the counter 152 is incremented by the pulse E. The operation of the two counters and the comparators are effected in response to the arrival of each of the up and down pulses and the write address of the memory circuit 105 is incremented by each trigger pulse E.

The operation of the circuit blocks in FIG. 12 will now be described with reference to the case of FIG. 7 for comparison with the previously described embodiment. Assuming first that in the initial condition the count outputs of the counter 152 and the up-down counter 150 are both 0, the first up pulse changes the up-down counter 150 to +1 but the count of the counter 152 remains 0 with the result that the comparator 150 generates a trigger pulse E and data B or $i_0$ is written in the memory circuit 105 at the first address or the address 0. Simultaneously, the counter 152 is incremented from 0 to +1 by the trigger pulse E. When the next up pulse arrives so that the up-down counter 150 is incremented from +1 to +2 and the counter 150 remains +1, the comparator 151 generates a trigger pulse E and data B or $i_1$ is written into the memory circuit 105 at the address 1. Also, the trigger pulse E increments the counter 152 from +1 to +2. Since the third incoming pulse is a down pulse, the up-down counter 150 is decremented from +2 to +1 and the counter 152 remains +2. Thus, the comparator 151 generates no trigger pulse E and the memory circuit 105 does not accept the current data B or $i_2$. Also, the counter 152 still maintains its count of +2. The fourth pulse is also a down pulse so that the up-down counter 150 is decremented from +1 to 0 and the counter 152 maintains its count of +2. Therefore, the comparator 151 does not generate any trigger pulse and the memory circuit 105 disregards the current data B or $i_3$. Also, the count of the counter 152 remains +2. The fifth pulse is an up pulse so that the up-down counter 150 is incremented from 0 to +1 by the up pulse and the count of the counter 152 remains +2. Thus, the comparator 151 still generates no trigger pulse so that the current data B or $i_4$ is not written into the memory circuit 105 and the count of the counter 152 remains +2. The sixth up pulse increments the up-down counter 150 from +1 to +2 but the count of the counter 152 still remains +2 with the result that the comparator 151 generates no trigger pulse and the current data B or $i_5$ is also disregarded. Also, the counter 152 maintains its count of +2. In other words, the data B corresponding to the third to sixth incoming pulses are duplicate data as mentioned previously and they are disregarded and not written into the memory circuit 105. Then, when the seventh up pulse arrives, the up-down counter 150 is incremented from +2 to +3 exceeding +2 of the counter 152 and thus the comparator 151 generates a trigger pulse E. Therefore, the write address of the memory circuit 105 is incremented from the address 2 to the address 3 and the data B or $i_6$ is written at the address 3.

As described so far, the data B excluding noise as shown in FIG. 10 are stored from the beginning in the memory circuit 105. In this case, the trigger pulses are generated with one-to-one correspondence to the positions of the stage 8 at intervals of the unit amount of monotonic movement in the forward direction (or the opposite direction) excluding the overlapping due to the oscillations in the scan movement of the stage 8 and the addresses of the memory circuit 105 also correspond thereto thus eliminating the need to use so-called flag data C.

Figure 13:
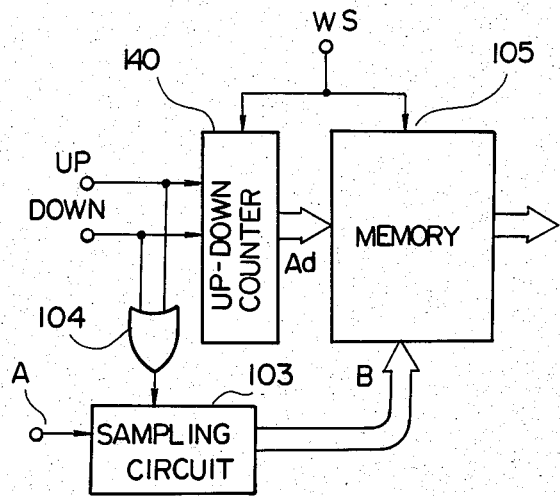
FIG. 13 is a circuit block diagram showing sampling extract means according to still another embodiment of the invention.

FIG. 13 is a circuit block diagram showing sampling extract means according to another embodiment of the invention.

In the above-described embodiments, when sampling an edge signal A as data B and successively storing the data B in the memory circuit 105, of the data B produced at the overlapping sampling positions due to minute oscillations of the stage 8 only the first data B in time is stored in the memory circuit 105 at one of the addresses and the subsequent duplicate data B are disregarded. However, the sampling extract means for storing the desired data B excluding any duplicate data in the memory circuit 105 may include an up-down counter for adding and subtracting the up and down pulses from the position detector 11 so as to directly access one of the addresses of the memory circuit 105 in accordance with the count signal from the counter. More specifically, the sampling extract means is constructed as shown by the circuit block diagram of FIG. 13. In the Figure, the component elements having the same functions as those of FIG. 3 are designated by the same reference numerals. In this circuitry, an up-down counter 140 receives the up and down pulses and a count signal Ad indicative of the number of pulses obtained by addition and subtraction is delivered onto the address bus of the memory circuit 105. On the other hand, the memory circuit 105 is placed in a data B write mode in response to a writing start signal WS generated from the microprocessor 108. Also, the counting operation of the up-down counter 140 is prevented and it is reset to −1 until it receives the writing start signal WS and the counter 140 starts counting the up and down pulses in response to the start signal WS.

With the construction described above, let it be assumed that the up-down counter 140 receives a pulse train as shown in FIG. 5 just after the generation of the start signal WS.

When the first up pulse is generated at a position $x_1$ the up-down counter 140 is incremented by 1 and the value of the count signal Ad becomes 0. Thus, the address 0 of the memory circuit 105 is accessed and the current data B or $i_0$ is stored at the address 0. Then, when the second up pulse is generated, similarly the value of the count signal Ad changes to +1 and the data B or $i_1$ is stored in the memory circuit 105 at the address 1. When the third pulse or down pulse is generated, the value of the count signal Ad changes to 0 so that the address 0 of the memory circuit 105 is accessed and data $i_2$ is stored in place of the previously stored data $i_0$. The next pulse is also a down pulse and the value of the count signal Ad changes to −1. However, the memory circuit 105 has no address corresponding to the address −1 and thus the data $i_3$ is not stored in the memory circuit 105. Then, the next pulse is an up pulse so that the address 0 of the memory circuit 105 is accessed and data $i_4$ is stored in place of the previously stored data $i_2$. Then, in response to the next up pulse, the address 2 of the memory circuit 105 is accessed and data $i_5$ is stored in place of the previously stored data $i_1$. In this way, when the stage 8 is caused to make minute oscillations, data are successively stored so as to update the previously stored data B and thus the sampling data of the edge signal A excluding the duplicate data are stored in the memory circuit 105 such that the data $i_4$ is stored at the address 0, the data $i_5$ at the address 1, the data $i_6$ at the address 2 and so on. This embodiment operates so as to update (replace) the preceding duplicate data B in such a manner that the duplicate data B caused at the same sampling positions due to the oscillations of the stage 8 are eliminated with only the duplicate data latest in time being left in the memory circuit 105. Thus, as compared with the circuitry of FIG. 3, the present embodiment has the advantage of ensuring a high speed reading and reduced circuit construction.

The edge signal obtained in this way is processed by the microprocessor 108 to detect the position of the edge. FIG. 14 shows a flow chart of a program for edge position detection processing.

The microprocessor 108 includes, as its functions, an address register ADR for addressing the memory circuit 105, an increment register INCR having the function of counting up data B and subjecting the resulting value to a division of $\frac{1}{2}$ n (where n=0, 1, 2 ...) and an internal memory M. While the microprocessor 108 will hereinafter be described as being operable by a software program, it is of course possible to use an exclusive hardware processor.

While the data B or detection signal (hereinafter referred to as an Ik) excluding the duplicate data and stored in the memory circuit 105 as mentioned previously contains no waveform disturbances due to oscillations, etc., of the stage 8, the detection signal still contains background noise due to the light on the specimen 7, noise due to the photoelectric conversion system and the following electric circuit system, etc., and it is assumed that considerable part of these noise consists of random noise having only transient correlation with respect to the stage scanning direction.

FIG. 15 is a waveform diagram of an edge signal A smoothed out on the basis of the data B excluding the duplicate data as mentioned previously and the abscissa represents the stage position in the scanning direction.

As shown in FIG. 15, a suitable threshold level VL is used so as to determine an area of the signal data which is to be processed by the microprocessor 108. This level VL may for example be established in accordance with a suitable ratio obtained from a background level value at any other place than the edges 7aR and 7aL and the edge signal peak value. Note that by processing the signal data exceeding the level, it is possible to reduce the effects of background noise, etc., and thereby effect the integration accurately.

When the program is started in FIG. 14, firstly at an initialize step 300, 0 is set in the register INCR and a starting address or $AD_i$ is set in the register ADR. The starting address $AD_i$ is the first address in the memory circuit at which the data B or $I_k$ exceeds the threshold level VL within the interval between the positions $x_1$ and $x_2$ as shown in FIG. 9 and it can be easily detected by examining the data B stored in the memory circuit 105 starting at the address 0. In the like manner, the final address at which the data B exceeds the threshold level VL is determined as $AD_e$ and the number of the addresses in the interval from $AD_i$ to $AD_e$ is determined as N at a step 301. Note that N corresponds to the number of the data B which are to be read from the data stored in the memory circuit 105.

A step 302 determines whether N=0 or whether N data B have been read. If it is not, a transfer is made to the next step 303.

At the step 303, the content (ADR) of the address designated by the register ADR is added to the value in the register INCR and the resulting sum is again stored in the register INCR.

Then, at a step 304, the designated address of the register ADR is incremented by 1 and also N is decremented by 1 thereby making for example the address $AD_{i+1}$ next to the address $AD_1$ in the memory circuit 105 accessible.

Returning again the control to the step 302, the similar processing is repeated until N=0. When N=0, the register INCR holds an integrated value Se (corresponding to the area of the hatched portion in FIG. 15) obtained by adding up all the data B stored at the addresses $AD_i$ to $AD_e$ in the memory circuit 105 and thus the integration processing of the edge signal A is effected.

More specifically, if the interval of the area between the addresses ADi and ADe shown in FIG. 15 is represented simply as [i,e], then the microprocessor 108 performs the following integration through the repetition of the steps 303 and 304

$$S_k = \sum_{K=i}^{e} I_k \qquad (1)$$

Assuming that the detection signal $I_k$ is a combination of an essential edge signal component $a_k$ and the previously mentioned random noise signal component $n_k$, then the integrated value $S_k$ is given by $$S_k = \sum_{k=i}^{e} a_k + \sum_{k=i}^{e} n_k \qquad (2)$$

The second integration term $$\sum_{k=i}^{e} n_k$$

is decreased as the addition of the steps 303 and 304 proceeds and $S_K$ varies with increase in the number of addresses as shown in FIG. 16. In other words, when the microprocessor 108 performs the addition from k=i to k=e so that the final integrated value $S_e$ is obtained, the random noise signal component is attenuated to the minimum. The steps 302 to 304 accomplish the function of the integrating means.

When N=0 is determined upon completion of the integrating operation at the step 302, the program proceeds to a step 305 where the microprocessor 108 computes ½ of the final integrated value Se obtained by addition by the register INCR and the resulting Se/2 is stored in the internal memory M.

Then, at a step 306, the address $AD_i$ is set in the register ADR and the register INCR is cleared to 0. Then, a transfer is made to a step 307 where the similar computation as the step 303 is performed and the similar integrating operation of the data B is performed successively starting at the address $AD_I$. At a step 308, it is determined whether the value of the register INCR in the course of the integrating operation is in excess of the stored value Se/2 in the internal memory M. If it is not, a transfer is made to a step 309 where the register ADR is incremented by 1 thus addressing the next address and also N is incremented by 1. Since the value of N is 0 when a transfer is made from the step 306 to the step 307 for the first time, in the course of the integration the value of N represents the number of the addresses advanced from the address $AD_i$. Thus, after the step 309, the processing is repeated from the step 307 so that when the value of the register INCR exceeds the stored value Se/2 in the internal memory M, a transfer is made to a step 310.

The steps 310 et seq., represent the processing whereby a position Xc at which the integrate intermediate value just attains the value Se/2 is obtained as an edge position by a linear interpolation technique.

At the time that the program proceeds from the step 308 to the step 310, the value of N represents the number of the addresses advanced from the starting address $AD_i$ and therefore $AD_{i+N}$ represents the corresponding address or the address at which the integrated value of the data B exceeds the value Se/2 for the first time. This address is represented as $AD_n$.

Figure 17:
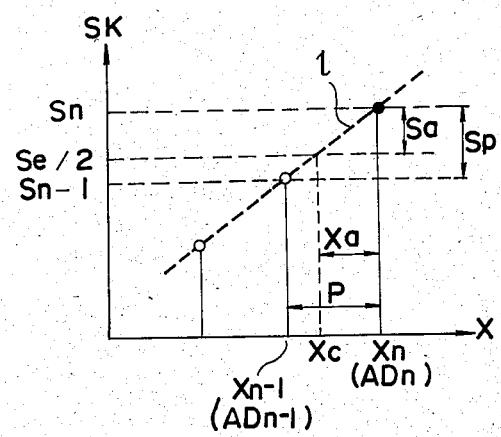
FIG. 17 is a graph for explaining the technique of position detection by linear interpolation.

The interpolation processing interpolates two sampled data by a straight line 1 as shown in FIG. 17 in which $X_n$ represents the position between the positions $x_1$ and $x_2$ and corresponding to the address $AD_n$ and $X_{n-1}$ represents the position corresponding to the just preceding address $AD_{n-1}$. In other words, at around the position where the integrated value attains the value Se/2 in the course of the integration, the integrated waveform is always a monotone increasing function and it can be represented by the straight line 1 as shown in FIG. 17. Thus, if $S_n$ represents the value of the register INCR at the address $AD_n$ (the position $X_n$) where the value of the register INCR exceeds the value Se/2 for the first time in the course of the integration at the step 307 and $S_{n-1}$ represents the value of the register INCR attained by the time that the step 307 was performed up to the preceding address $AD_{n-1}$ (the position Xn−1), then the value Se/2 is between the values Sn and Sn−1 as shown in FIG. 17 so that if the straight line 1 is interpolated using the value Se/2 as a cut level, the edge position $X_c$ between the position $X_n$ and $X_{n-1}$ can be obtained. At the steps 310 to 312, the microprocessor 108 performs this interpolating operation to detect the edge position $X_c$. Firstly, in accordance with the difference Sp between the value $S_n$ of the register INCR attained by the time that the step 307 was performed up to the address $AD_n$ and the value $S_{n-1}$ of the register INCR attained by the time that the step 307 was performed up to the preceding address $AD_{n-1}$ (in this case, the difference Sp is equal to the data B itself at the address $AD_n$), the difference $S_e$ between the value $S_n$ and the value Se/2 in the memory M and a sampling pitch P or the unit amount of scanning movement corresponding to the spacing between the position pulses or the up and down pulses from the position detector II, a distance $X_a$ from the position $X_n$ corresponding to the difference $S_a$ is obtained in accordance with $P·S_a/Sp$ at the step 310. Note that in FIG. 14 the data B at the address $AD_n$ designated by the register ADR or the difference Sp is indicated as (ADR) to represent the contents of the step 310.

Then, at the step 311, the value $AD_n$ of the register ADR is multiplied by the sampling pitch P and the resulting value is combined with the value of the starting position $X_1$ stored in the microprocessor 108 thus obtaining the scanning position $X_n$ corresponding to the address $AD_n$.

Lastly, at the step 312, the distance $X_a$ is subtracted from the position $X_n$ thus obtaining the edge position $X_c$. In this way, the steps 305 to 312 accomplish the function of the position detecting means.

In the case of this embodiment, the position $X_c$ obtained in the above-mentioned manner corresponds to the position which divides in two the area value $S_e$ of the hatched portion in FIG. 15 or the barycenter position of the edge signal.

If the edge signal has a waveform which is symmetrical with respect to its peak point, the position $X_c$ is the peak point position which coincides with the edge position.

For instance, if the edge signal waveform is not symmetrical with respect to the peak point and it lies toward the position $X_1$ or $X_2$ (the waveform rises sharply and falls smoothly or the reverse), the cut level factor of ½ at the step 305 may be changed to a suitable ratio such as 2/5 or 3/5 thereby effecting the desired position detection of the peak point. For this purpose, it is only necessary to preliminarily observe the waveform of the detected edge signal and set the desired ratio factor.

Figure 18:
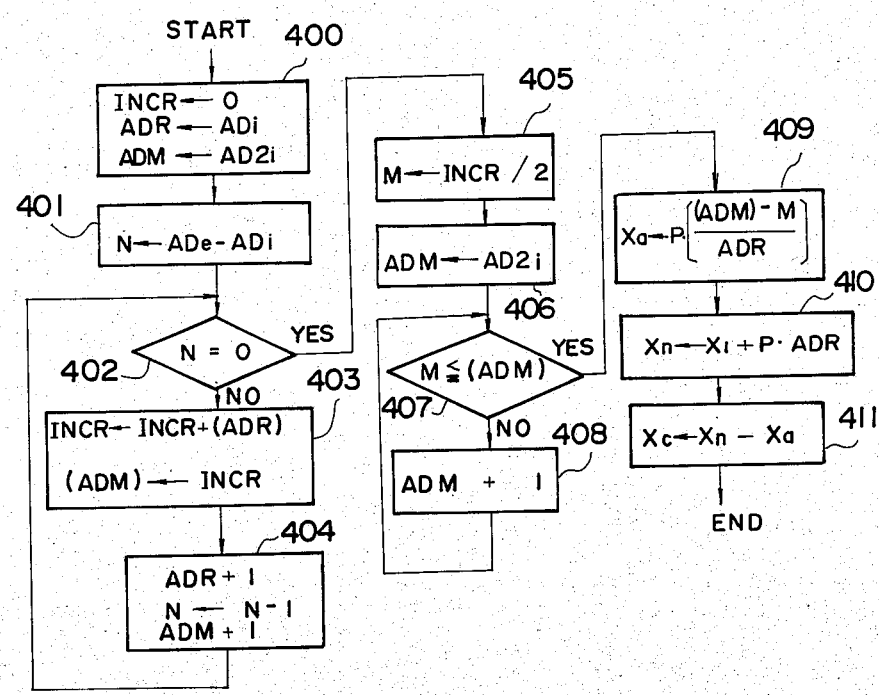
FIG. 18 is a flow chart diagram of another integration and position detection processing program executed by the microprocessor.

FIG. 18 shows another flow chart of a program for the edge position detection processing by the microprocessor 108 by way of example different from that of FIG. 14.

The microprocessor 108 includes, as its functions, address registers ADR and ADM for addressing the memory circuit 105, an increment register INCR having the function of counting up data B and subjecting the resulting value to a division of ½n (where n=0, 1, 2 ...) and an internal memory M. The present program differs from that of FIG. 14 in that the microprocessor 108 includes the address register ADM, that the memory circuit 105 also stores an integrated value $S_k$ of an edge signal and that the address register ADM is used for addressing the integrated value $S_k$.

Figure 19:
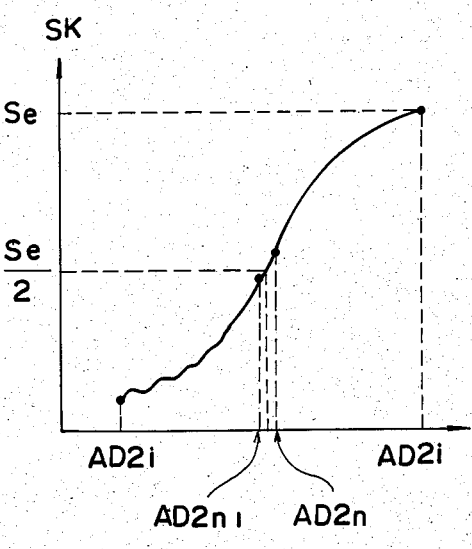
FIG. 19 is a graph showing variations of the stored integrated value at different addresses

In FIG. 18, when the program is started, in the like manner as in FIG. 14, firstly 0 is set in the register INCR and a starting address or $AD_i$ is set in the register ADR at an initialize step 400. At the step 400, a starting address $AD_{2i}$ is also set in the register ADM. As shown in FIG. 19, the starting address $AD_{2i}$ is the first address in the memory circuit 105 at which the integrated value $S_k$ is stored and there is one-to-one correspondence between the addresses $AD_i$ to $AD_e$ and the addresses AD2i to AD2e and naturally $AD_e - AD_i = AD_{2e} - AD_{2i}$.

The next steps 401 and 402 are respectively the same with the steps 301 and 302 in the case of FIG. 14.

At a step 403, the content (ADR) of the address designated by the register ADR is added to the value of the register INCR and the resulting sum is again stored in the register INCR. Then, the value of the register INCR is stored in the memory at the address designated by the register ADM. Here, (ADM) means the content of the address designated by the register ADM.

Then, at a step 404, the designated address of the register ADR is incremented by 1 and the value of N is decremented by 1 thus making for example the address $ADi+1$ next to the address $AD_i$ in the memory circuit 105 accessible as in the case of the step 304 shown in FIG. 14. Also, the designated address of the register ADM is incremented by 1 and the address $AO2_{i+1}$ next to the address $AD2_i$ is made accessible.

The program again returns to the step 402 and in this way the similar processing is repeated until N=0 results. When N=0 results, the register INCR holds the integrated value $S_e$ obtained by adding up all the data B stored in the memory circuit 105 at the addresses $AD_i$ to $AD_e$.

When the above integrating operation is completed so that N=0 is determined at the step 402, the program proceeds to a step 405 is the same as the previously mentioned step 305.

Then, at a step 406, the address $AD2_i$ is set in the register ADM. Since the integrated value $S_k$ is stored at each of the addresses $AD2_i$ to $AD2_e$, a step 407 determines whether the values of the integrated value $S_k$ are greater than the stored value $S_e$ in the internal memory M. If it is not, the register ADM is incremented by 1 at a step 408. In this way, after the step 408, the program is repeated from the step 407 so that when the value of the integrated value $S_k$ at the address designated by the register ADM exceeds the stored value Se/2 in the internal memory M, the program proceeds to a step 409.

Assume now that the address indicating the integrated value $S_k$ greater than the stored value Se/2 is $AD2_n$ as shown in FIG. 19. The step 409 is the same with the previously mentioned step 310 except that the value of the register INCR is replaced with (ADM). Steps 410 and 411 are respectively the same with the steps 311 and 312 in the case of FIG. 14.

In accordance with the above described embodiments, even in the case of photoelectric detection signals having a deteriorated S/N ratio, a cut level obtainable by an integrating operation is stable enough and also an integrated waveform in the vicinity of the cut level is a monotonically increasing signal having an improved S/N ratio, thus effecting the detection of an edge position ($X_c$) with improved reproducibility and also producing a noise component reducing effect due to the integrating operation and thereby making possible the accurate detection of an edge position.

Also, by selecting the cut level determining factor to be ½ as in the previously mentioned case, it is possible to detect the barycenter position of an edge signal waveform and this means that it is possible to obtain stable edge position information determined on the basis of the waveform as a whole even if the edge point detection fails to specify the edge position of a double-packed edge signal which may possibly be generated in cases where, for example, the distribution of diffused light from the edges of various patterns on a semiconductor wafer are detected.

Further, since the value itself of the position $X_c$ to be detected is obtained by the interpolation calculation by the microprocessor 108, it is possible to effect a high-resolution position detection without being affected by for example the quantization at the sampling pitch P in the sampling circuit 103.

Further, since the above-described program processing by the microprocessor requires no multiplication processing such as a filtering and performs an integrating operation by effecting the principal calculations by addition alone, it is possible to realize a system which is simple in construction and capable of high speed calculations.

While, in the above-described embodiments, mainly the detection of a apecified position $X_c$ of a single edge signal is effected, if, for example, the linewidth of a pattern, e.g., the spacing (the edge spacing) between the edges 7aL and 7aR in the case of the pattern 7a of FIG. 2(a) is to be measured, where XcL represents the specified position of an edge signal for the edge 7aL and XcR represents the specified position of an edge signal for the edge 7aR, the positions XcL are each determined by the same technique as mentioned previously and then the difference (XcR − XcL) is obtained thereby accurately detecting the linewidth W of the pattern.

Then the present invention is not limited to the above-described method of digitally processing an integration and position detection through the execution of a program by the microprocessor 108 and it also includes a method of analogically performing the operations as will be described hereunder.

Where the invention is carried out by the analog processing method, basically the scanning by the stage 8 is repeated at least twice on the same objective pattern.

Figure 20:
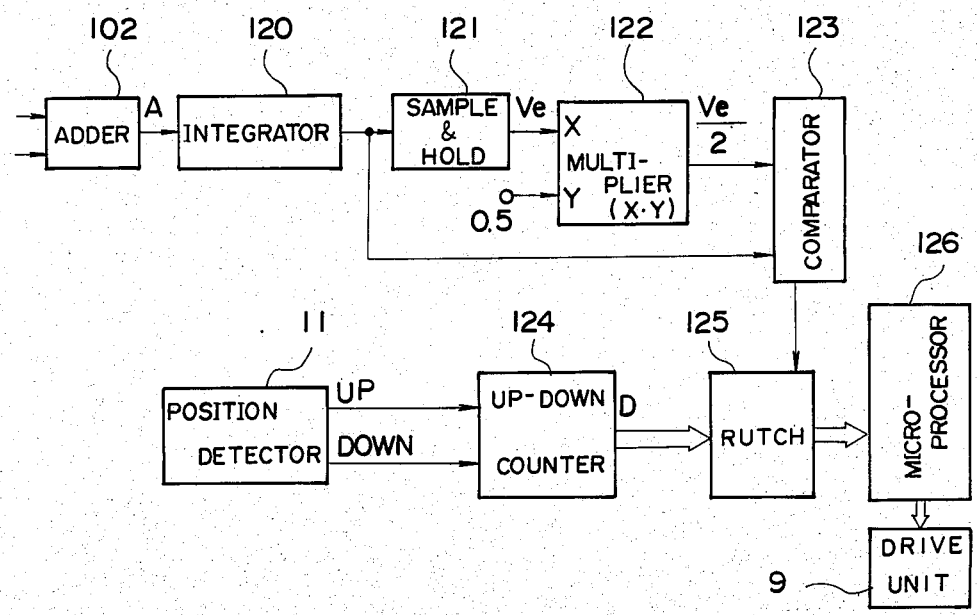
FIG. 20 is a block diagram showing the principal part of an analog type signal processing system for integrating and position detecting purposes according to the invention.

FIG. 20 is a block diagram showing the principal part of an analog processing-type embodiment of the present invention and FIGS. 21a, 21b and 21c show a plurality of waveforms for explaining the manner of signal processing.

In FIG. 20, an edge signal A is an analog signal generated from the adder 102 of FIG. 3 and the edge signal A is time integrated by an integrator 120 with respect to the portion exceeding a predetermined threshold value V1 similar to the threshold level VL shown in FIG. 15 as shown in FIG. 21a. In other words, the integrator 120 includes a circuit for comparing the thresfold voltage V1 and the edge signal A and a gate circuit for charging an integrating capacitor when A≧V1.

A sample and hold circuit 121 is provided so that the result of the integration by the integrator 120 of the edge signal by the first scanning is temporarily stored as an integrated final value Ve as in FIG. 2b upon transition from the condition of A≧V1 to the condition of A°V1, and the integrator 120 is followed by a multiplier circuit 122 for dividing (multiplying) the integrated final value Ve by a predetermined cut level (a factor of 0.5 in this embodiment) and generating an output signal. A comparator 123 compares the output Ve/2 of the multiplier circuit 122 and an output of the integrator 120 indicative of an intermediate integration of an edge signal by the second scanning so as to generate a gate signal when the output Ve/2 is exceeded by the output from the integrator 120 in the course of the second scanning as in FIG. 21c. Note that the comparator 123 is controlled by a microprocessor 126 (of the same type as the microprocessor 108 of FIG. 3) so that the comparator 123 is made operable (enabled) only during the second scanning. Thus, the time that a gate signal is generated from the comparator 123 just corresponds to the position of the edge and therefore a latch circuit 125 performs a latching operation in response to the leading edge of the gate signal. The latch circuit 125 is supplied with the count of an up-down counter 124 which counts the up and down pulses from the position detector 11 (FIG. 3) to generate position data D in the like manner as the counter 107 in the embodiment of FIG. 3. As a result, the microprocessor 126 receives as edge position data the position data D applied so far to the latch circuit 125 in response to the positive-going transition of the gate signal from the comparator 123 and in accordance with the edge position data the microprocessor 126 controls the drive unit 9 so as to establish a predetermined relation between the stage 8 and the objective lens 4 in FIG. 1 and thereby effect the positioning of the stage 8, etc. Note that the integrator 120 forms integrating means and the multiplier 122, the comparator 123, the up-down counter 124, the latch circuit 125 and the position detector 11 form position detecting means.

With this analog processing system, the edge signal A is still subject to swinging due to minute oscellations during the stage scanning. Thus, to eliminate any overlapping of a detection signal at the same positions, it is only necessary to provide for example gate circuit means on the output side of the adder 102 as shown in FIG. 22.

Figure 22:
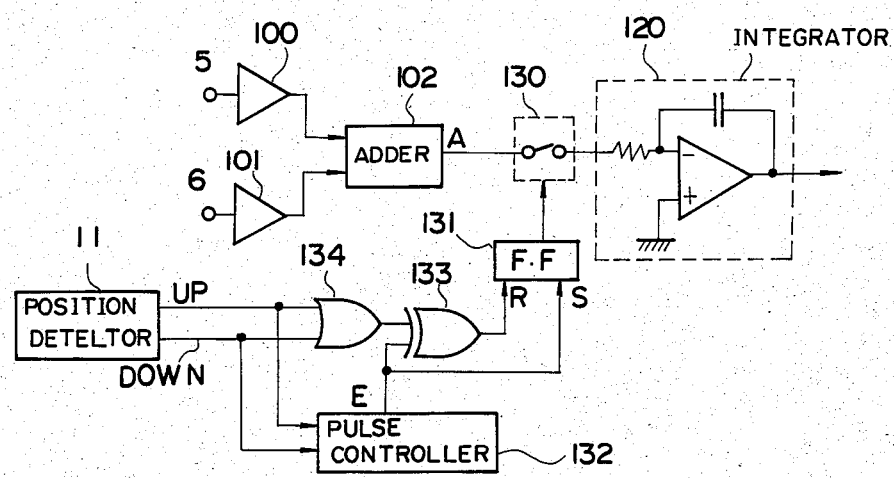
FIG. 22 is a block diagram showing the principal part of a modification of the embodiment shown in FIG. 20.

More specifically, in FIG. 22 the edge signal A from the adder 102 is applied to the integrator 120 through an analog gate switch 130. Also, the up and down pulses from the position detector 11 are applied to an OR circuit 134 and a pulse controller circuit 132 and the pulse controller circuit 132 is of the same type comprising the up-down counter 150, the counter 152 and the comparator 151 in the embodiment of FIG. 12 so as to generate a trigger pulse E of the previously mentioned type from the up and down pulses. Then, the output of the OR circuit 134 and the trigger pulse E are applied to an exclusive OR circuit or EX OR circuit 133 so that a flip-flop 131 is set by the trigger pulse E and reset by the output of the EX OR circuit 133. The gate switch 130 is turned on when the flip-flop 131 is set and it is turned off when the flip-flop 131 is reset. Note that the circuitry of FIG. 22 is used by adding it to the circuitry of FIG. 20.

With the above construction, the operation will now be described with reference to FIG. 6. A trigger pulse E is generated just after the generation of the first up pulse so that the output of the EX OR circuit 133 goes to "0" and the flip-flop 131 is set by the trigger pulse E. Thus, the gate switch 130 is turned on so that the current edge signal A is applied to and integrated by the integrator 120. The second up pulse also generates a trigger pulse E and thus the gate switch 130 remains on. However, the third to sixth up and down position pulses generate no trigger pulse E so that the output of the EX OR circuit 133 goes to "1" and the flip-flop 131 is reset. Thus, during the interval the gate switch 130 is opened and the edge signal A is not applied to the integrator 120. When the seventh up position pulse is applied so that a trigger pulse E is generated, the flip-flop 131 is again set and the gate switch 130 is turned on. Thus, the current edge signal A is applied to the integrator 120 and the integration is continued. In this way, the gate switch 130 is turned on only at positions where a trigger pulse E is generated and therefore the switch 130 is controlled to open and close such that consequently the scanning positions correspond to data $D_0$, $D_1$, $D_2$—in data D in monotonically increasing order and there is no danger of the signal A for the same positions being applied overlappingly due to the scanning oscillations. As a result, the integrated final value Ve contain no noise due to the minute oscillations of the stage 8 and the position detection is effected accurately by the analog method too.

While, in the above description, the photoelectric detection signals generated by the diffused light from the edges 7aL and 7aR of the pattern 7a in bar form as shown in FIG. 2(a) are subjected to the process of signal processing, the present invention is not limited to these signals and detection signals from a variety of patterns can be processed equally.

FIG. 23 shows another example of the edge detection in which a deffraction grating pattern 160 formed on a wafer is scanned by an elongate beam spot 161 and the resulting diffracted light intensity variations are shown at the bottom of the Figure. In this case, the beam spot 161 has a long and narrow form along the direction of arrangement of the grating 160 and its width is equal to the width of the grating. By so arranging, it is possible to detect the diffracted light as a beam signal 162 as shown at the bottom of the Figure and this can be utilized for aligning a beam spot with a grating pattern 160 on a wafer through the scanning movement of a stage carrying the wafer thereon in an exposure system for the manufacture of integrated circuits. In this case, diffused light is produced from the edge of each of the bars in the grating pattern and the diffused light produced in the direction of arrangement of the bars reinforce (or weaken) each other thereby producing diffracted light.

FIG. 24 shows still another example of the edge detection for an exposure system in which a mask 163 is illuminated and a shading image of the pattern of the mask 160 formed through an optical system is detected by a photoelectric detecting element 166 through a slit opening or pinhole 165 formed on a stage 164. By moving the stage 164 to the right as shown by the arrow with respect to the mask 163, it is possible to detect the light intensity distribution of the shading image of the pattern as a signal 167, for example, and the method can be utilized to detect the position of the shading edge through the detection of the leading edge of the signal 167, through the detection of the peak position if the width of the shading image of the mask pattern is equal to the width of the slit opening 165 or the like for positioning the mask 163.

FIG. 25 shows still another example of the edge detection for an exposure system in which an object or mask 163 is illuminated and a shading image of the pattern of the mask 163 through an optical system is detected by a photoelectric detecting element 166 through a slit opening or pinhole 165 formed on a stage 164. By moving the stage 164 to the right as shown by the arrow with respect to the mask 163, it is possible to detect the light intensity distribution of the shading image of the pattern as a peak signal 168, for example, and the method can also be used for positioning the mask 163 by detecting for example the position of the shading edge through the detection of the leading edge of the peak signal 168 and so on.

By subjecting the peak signal 162 in the case of FIG. 23, the peak signal 167 in the case of FIG. 24 and the peak signal 168 of FIG. 25 to the noise suppression processing of the invention, it is possible to obtain accurate position information corresponding to the absolute position of the stage. Thus, by integrating the position information to effect the position detection and utilize in various positioning operations, it is possible to contribute toward the realization of a high degree of accuracy.

While, in the above-described embodiments, the stage is moved so as to effect a relative scanning of a pattern by a spot, it is possible to move a spot by a scan movement of an optical system including a galvanomirror, polygon mirror to ultrasonic light deflector and in this case the scanning drive unit of the optical system may be provided with a scanning position detecting function for generating up and down pulses so as to accomplish the similar pattern information processing.

While, in the above-described embodiments, the position detecting means comprises a so-called measuring machine (or angle measuring machine) which generates pulses incrementally, the position detecting means may comprise an absolute measuring machine (or angle measuring machine).

In this case, the absolute angle measuring machine generally generates no pulse train and it directly generates position data. Thus, where such a measuring machine is used, it is only necessary to replace the up-down counter 150 of FIG. 12 with the measuring machine and use the trigger pulses E of FIG. 12 as the sampling pulses for the sampling circuit 103. In the case of the absolute measuring machine, however, position data itself is an absolute numerical value and therefore the position data is not directly applied to the comparator 151 but applied to the comparator 151 through a digital adding and subtracting circuit. Then, a given value is added or subtracted from the position data from the measuring machine such that the output value of the adding and subtracting circuit becomes zero at the position $x_1$ shown in FIG. 4.

Further, in addition to the previously mentioned alignment machine, the present invention can be used effectively in applications such as the measurement of the position coordinates of fine patterns on a mask or wafer, the measurement of the distance between separated chip patterns or the alignment of a wafer in a step-and-repeat type exposure system.

The present invention is also useful for the detection of patterns on a wafer or mask by means of an electron beam and it is possible to similarly eliminate noise from the signal generated by detecting the diffused electrons caused at the edge of a pattern. The present invention is also very useful in the detection of an internal pattern profile of an object by means of a ultrasonic microscope.

What is claimed is:
1. A method of detecting a position of each of the edges of a pattern of a predetermined shape on an object emitting a radiation indicative of the pattern through reception of the radiation, the method comprising the steps of:
(a) scanning said object in a predetermined direction and detecting the radiation from said object;
(b) successively generating a pattern signal corresponding to said pattern in response to said scanning in accordance with said detected radiation from said object;
(c) detecting a position of said scanning along said predetermined direction and successively generating a position signal each time the position of said scanning advances a predetermined unit amount;
(d) sampling a value of said pattern signal in response to each of said position signals;
(e) storing said position signals and the values of said pattern signal in such a manner that each of said position signals is paired with one of said pattern signal values sampled in response to each said position signal; and
(f) rearranging said stored pairs of said position signals and the values of said pattern signal in such a manner that said position signal of each said pair does not indicate the same scanning position as said position signals of the other of said pairs.

2. An apparatus for detecting a position of each of the edges of a pattern of a predetermined shape on an object emitting a radiation indicative of the pattern through reception of the radiation, said apparatus comprising:
(a) means adapted to scan said object in a predetermined direction with respect to said object to detect the radiation from said object, said means successively generating a pattern signal corresponding to said pattern in response to said scanning in accordance with said detected radiation;
(b) position detecting means for detecting a position of the scanning of said radiation detecting means along said predetermined derection and generating a position signal each time the position of said scanning advances a predetermined unit amount; and
(c) means for sampling a value of said pattern signal in response to each of said position signals, said sampling means eliminating each overlapping value of said pattern signal sampled at the same scanning position as any one of the values of said pattern signal.

3. An apparatus according to claim 2, wherein said sampling means includes means for storing the values of said pattern signal having one-to-one correspondence to the positions of said scanning displaced from each other in said predetermined direction by said predetermined unit amount.

4. An apparatus according to claim 2, wherein said position detecting means includes means for generating a first pulse each time the position of said scanning advances in said predetermined direction by said predetermined unit amount and generating a second pulse each time the position of said scanning advances in an opposite direction to said predetermined direction by said unit amount.

5. An apparatus according to claim 4, wherein said sampling means includes: first counting means for counting such that a count thereof is increased by 1 in response to each of said first pulses and is decreased by 1 in response to each of said second pulses; second counting means for counting pulses; and comparison means for applying a pulse to said second counting means each time there is a predetermined difference between the counts of said first and second counting means.

6. An apparatus according to claim 5, wherein said sampling means includes means for storing a sampled value of said pattern signal in response to a pulse generated from said comparison means.

7. An apparatus for detecting a position of each of the edges of a pattern of a predetermined shape on an object emitting a radiation indicative of the pattern through reception of the radiation, said apparatus comprising:
(a) means for scanning said object in a predetermined direction;

(b) means responsive to the radiation from said object to successively generate a pattern signal corresponding to said pattern each time a position of said scanning advances a predetermined unit amount;

(c) position detecting means for detecting the position of said scanning to generate a position signal; and (d) means for storing said pattern signals, said storing means being responsive to said position signals to eliminate any of said pattern signals generated at the same scanning position as the other of said pattern signals.

8. An apparatus for detecting a position of a pattern of a predetermined shape on an object emitting a radiation indicative of the pattern through reception of the radiation, said apparatus comprising:

(a) means adapted to scan said object in a predetermined direction with respect to said object to detect the radiation from said object, said means successively generating a pattern signal corresponding to said pattern in response to said scanning in accordance with said detected radiation;

(b) position detecting means for detecting a position of the scanning of said radiation detecting means along said predetermined direction and generating a position signal each time the position of said scanning advances a predetermined unit amount; and (c) means for sampling a value of said pattern signal in response to each of said position signals, said sampling means eliminating each overlapping value of said pattern signal sampled at the same scanning position as any one of the values of said pattern signal.

9. An apparatus according to claim 8, which further comprises:

means for establishing a given interval within an area scanned by said scanning;

means for integrating said sampled pattern signal in said predetermined direction within said given interval and successively calculating integrated values;

means for establishing a reference value having a predetermined ratio to an integrated value of said pattern signal over the whole extent of said given interval; and means for detecting a position of said scanning corresponding to one of said calculated integrated values substantially equal to said reference value.

10. An apparatus according to claim 8, which further comprises:

integrating means for integrating said sampled pattern signal with a position of said scanning as a parameter to successively calculate integrated values, said integrating means including means for controlling an interval between start and stop points of the integration of said pattern signal corresponding to positions of said scanning;

means for establishing a reference value having a predetermined ratio to an integrated value calculated by said integrating means over the whole extent of said interval controlled by said control means; and means for detecting a position of said scanning corresponding to one of said calculated integrated values substantially equal to said reference value.

11. An apparatus for detecting the intensity distribution of a radiation indicative of the pattern of an object comprising:

(a) stage means;

(b) radiation detecting means for detecting the intensity of the radiation from the object and successively generating a radiation intensity signal, said radiation detecting means being mounted on said stage means;

(c) moving means for moving said stage means in the predetermined direction;

(d) position detecting means for detecting a position of said stage means along said predetermined direction and generating a position signal each time said stage means is moved a predetermined unit amount by said moving means; and (e) means for sampling a value of said radiation intensity signal in response to each of said position signals, said sampling means eliminating each overlapping value of said radiation intensity signal sampled at the same position of said stage as any one of the values of said radiation intensity signal.

12. An apparatus according to claim 11, wherein said radiation detecting means includes a photoelectric detecting element.

13. An apparatus according to claim 11, wherein said sampling means includes means for storing the values of said radiation intensity signal having one-to-one correspondence to the positions of said stage displaced from each other in said predetermined direction by said predetermined unit amount.

14. An apparatus according to claim 11, wherein said position detecting means includes means for generating a first pulse each time the position of said stage is moved by said moving means in said predetermined direction by said predetermined unit amount and generating a second pulse each time the position of said stage is moved by said moving means in an opposite direction to said predetermined direction by said unit amount.

15. An apparatus according to claim 13, wherein said sampling means includes:

first counting means for counting such that a count thereof is increased by unity in response to each of said first pulses and is decreased by unity in response to each of said second pulses;

second counting means for counting pulses; and comparison means for applying a pulse to said second counting means each time there is a predetermined difference between the counts of said first and second counting means.

16. An apparatus according to claim 14, wherein said sampling means includes means for storing a sampled value of said radiation intensity signal in response to a pulse generated from said comparison means.

17. An apparatus for detecting the intensity distribution of a radiation indicative of the pattern of an object comprising:

(a) stage means;

(b) radiation detecting means for detecting the intensity of the radiation from the object and successively generating a radiation intensity signal, said radiation detecting means being mounted on said stage means;

(c) displacing means for producing a relative displacement in a predetermined direction between said object and said stage;

(d) displacement detecting means for detecting said relative displacement and generating a displacement signal each time a predetermined unit amount of said relative displacement is produced by said displacing means; and (e) means for sampling a value of said radiation intensity signal in response to each of said displacement signals, said sampling means eliminating each overlapping value of said radiation intensity signal sampled at the same amount of said relative displacement as any one of the values of said radiation intensity signal.

* * * * *